Patented Sept. 16, 1930

1,776,016

UNITED STATES PATENT OFFICE

EARL BURNARD ALVORD, OF CLEVELAND HEIGHTS, OHIO, ASSIGNOR, BY MESNE ASSIGNMENTS, TO THE GRASSELLI CHEMICAL COMPANY, OF CLEVELAND, OHIO, A CORPORATION OF DELAWARE

TRANSPLANTER

No Drawing. Application filed January 30, 1928. Serial No. 250,717.

Seeds and seedlings intended for transplanting are commonly grown in perishable pots which, when set into the ground, will rot, disintegrate, or decompose, giving the roots free access to the surrounding soil. Such pots are made in various shapes and materials: Paper, ligneous materials such as bagasse, straw, peat, etc., have been used for this purpose, and it has also been suggested to incorporate various organic and soluble inorganic fertilizers into the composition of these pots so as to assist their decomposition in the soil and furnish nourishment to the plant in the early stages of development. Some of the materials used in making such pots will not decompose or perish, when transplanted, but the pots will disintegrate and allow circulation of the solutions in the soil and free access of the roots to the surrounding soil.

I have now found that certain substantially water insoluble but neutral ammonium citrate soluble phosphatic fertilizers are particularly adapted for incorporation into such perishable transplanting pots and my invention comprises a method of making these pots and the novel pots themselves.

Phosphate rock used in the manufacture of phosphoric acid and soluble phosphates contains iron and aluminum compounds. In decomposing the rock with sulfuric acid, these go into solution and are precipitated in the form of phosphates together with other water insoluble compounds, each as dicalcium phosphate, by careful partial neutralization of the crude phosphoric acid solution. This precipitate, after filtration and drying, is a more or less colloidal, slimy product containing anywhere from 10 to 40% citrate soluble phosphoric acid. It is usually called "high grade residue" and for purposes of this invention I wish it understood that this term is intended to designate this particular iron, aluminum, calcium phosphate and other compounds containing residue obtained in the partial neutralization of crude phosphoric acid from the decomposition of phosphate rock with sulfuric acid.

Straight dicalcium phosphate, when precipitated under proper conditions from monocalcium phosphate solution, is also obtained in a more or less colloidal slimy condition; it is substantially water insoluble but citrate soluble.

The properties of these colloidal, slimy water insoluble but citrate soluble phosphates make them eminently suited for incorporation into perishable transplanting pots. Their slimy consistency makes them valuable as a binder for the loose material of which the pots are usually made. Being practically insoluble in water, they will not be leached out while watering the pots before transplanting. The phosphoric acid content is only made available gradually and particularly only after the pots have been transplanted and the seedlings reach a certain growth when most nourishment for the plant is required. The perishable materials used for making the pots contain usually sufficient nitrogen and potassium compounds, but are deficient in phosphoric acid, and this latter essential plant food element is easily supplied by these substantially water insoluble but neutral ammonium citrate soluble phosphatic fertilizers incorporated into the body of the transplanter.

A very convenient manner of making perishable transplanting pots consists in beating ligneous material into a watery pulp, compressing this into forms, draining the excess water and drying the pots. Made without a binder such pots are rather friable and are easily broken when shipped to distant points. Glue or other organic binders are not always desirable due to their obnoxious smelling decomposition products, and inorganic binders, such as silicate of soda, are unsuited as they would retard the decomposition of the pots in the soil and also impair their porosity upon which their usefulness depends.

Peat is a material which has been very successfully used in making such transplanting pots. It can be easily formed into the various desired shapes, and is easily decomposed, or the pots at least disintegrate sufficiently in the soil to allow unhampered development of the plants.

I have found that peat pots containing a certain percentage of slimy, colloidal phosphates, such as high grade residue or dicalcium phosphate, are particularly adapted for growing tender seeds and seedlings intended for transplanting. The high grade residue or dicalcium phosphate serves as a binder which will decrease the friability and also furnish the phosphoric acid plant food element required in the development of the young plant. The high grade residue or dicalcium phosphate contained therein does not prevent the deterioration of the pot in the soil; on the contrary, while being decomposed slowly by the acids in the soil, it will assist in the disintegration of the peat agglomerates. The amount of high grade residue, etc., to be incorporated can be varied within very wide limits. This depends on the phosphoric acid content of the residue, the needs of the plant, the binding action required, etc. These pots are intended for general distribution and are used under very different conditions. I, therefore, prefer to incorporate sufficient phosphate with the pots to accommodate the various requirements, and I found that 10 to 15% of the dry pot material represents a fair average which will satisfy all reasonable requirements.

My novel process of making the fertilized perishable transplanting pots consists in pulping the peat or other ligenous material in a Hollander or beater with sufficient water to form a slurry containing over 90% water. I add then in this beater, or otherwise, the required amount of high grade residue or slimy dicalcium phosphate. This mixture is then fed into a slurry storage tank in which it is kept agitated and from which it is run into a battery of forming molds. These molds consist of a screen and plunger with attachment for blowing out the excess water. The wet pots obtained in these molds consist of approximately one-third solid and two-thirds water. They are subsequently dried in an ordinary steam drier to eliminate the moisture. The water which runs out of the molds and is expelled from the pots is returned to the Hollander, additional water being added to compensate for that retained by the wet pots when taken from the molds. The high grade residue is preferably added to the pulp or slurry in the beater. In this manner a most intimate mixture of the two is obtained and also the binding action of the slimy phosphatic material is more pronounced. It can, of course, be added in the storage tank while agitating the mixture therein. The colloidal, slimy nature of the high grade residue and dicalcium phosphate makes them adhere firmly to the ligneous material and prevents separation of the mixture or stratification in the pots. Other fertilizing materials can be incorporated simultaneously with the high grade residue. In the case of soluble fertilizers it is advisable to use a solution of same as beating and circulating liquor and to adjust its concentration so that the amount of liquor remaining in the wet pot before drying contains the desired amount of soluble fertilizer.

While the manufacture of my novel transplanter has been described specifically in reference to the use of peat, it will be understood that other ligneous organic materials, such as paper or wood pulp, straw, bagasse, etc., can be used in this process and similar porous transplanting pots which will disintegrate in the soil and furnish necessary plant food element to the growing plants will be obtained.

I claim:

1. A transplanting pot composed of a ligneous organic material mixed with a substantially water insoluble but citrate soluble, more or less colloidal, slimy phosphate.

2. A transplanting pot composed of a ligneous organic material mixed with substantially water insoluble but citrate soluble iron and aluminum phosphate.

3. A transplanting pot composed of peat and substantially water insoluble but citrate soluble iron and aluminum phosphate.

4. A transplanting pot composed of ligneous organic material mixed with high grade residue from the manufacture of phosphoric acid.

5. A transplanting pot composed of peat mixed with high grade residue from the manufacture of phosphoric acid.

In testimony whereof, I affix my signature.

EARL BURNARD ALVORD.